Oct. 1, 1935. H. C. CONORD 2,016,034
PROJECTION SYSTEM
Filed Oct. 14, 1931 3 Sheets-Sheet 1
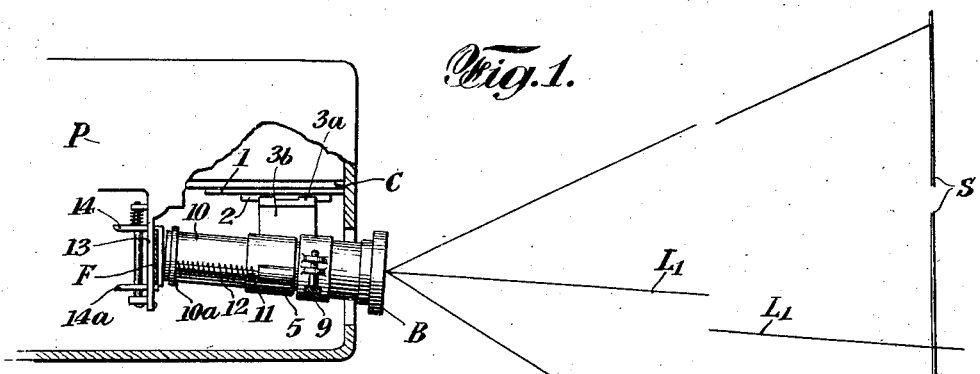
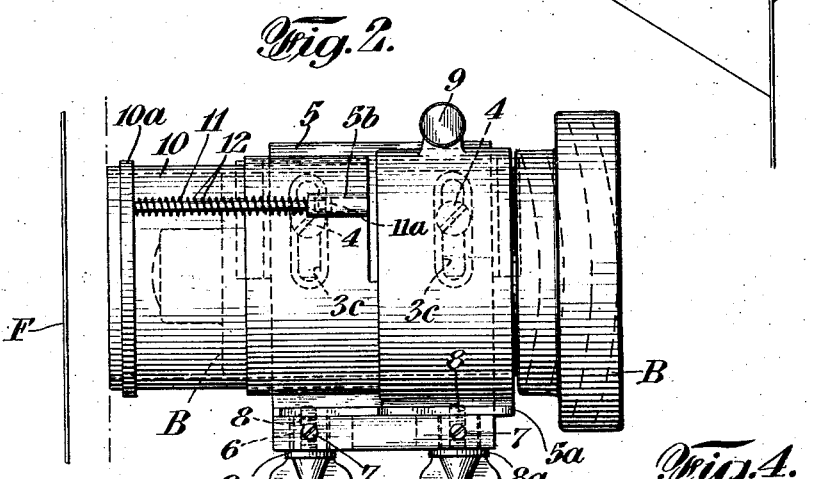
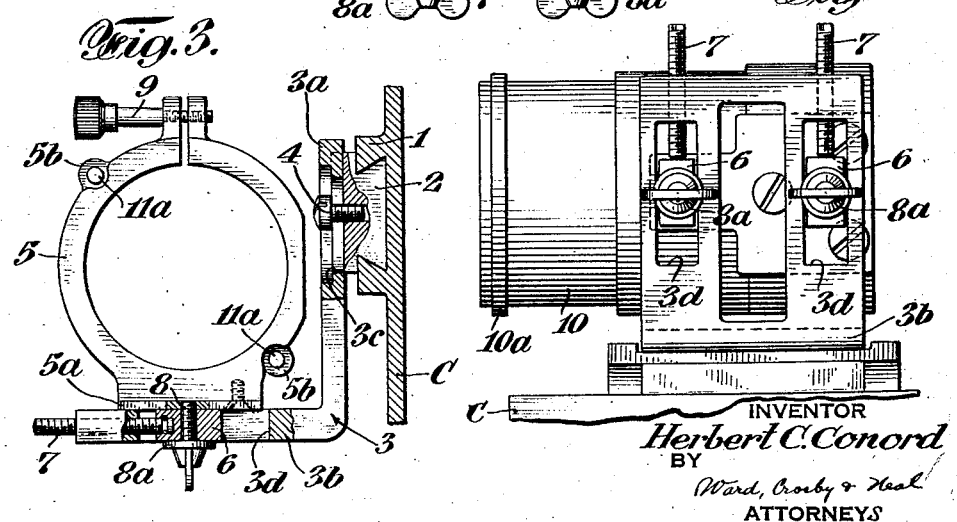
INVENTOR
Herbert C. Conord
BY
Ward, Crosby & Neal
ATTORNEYS

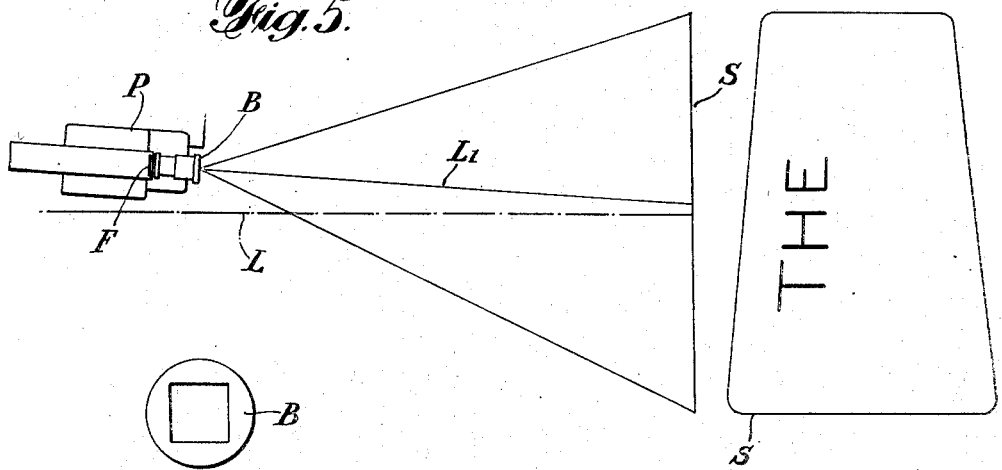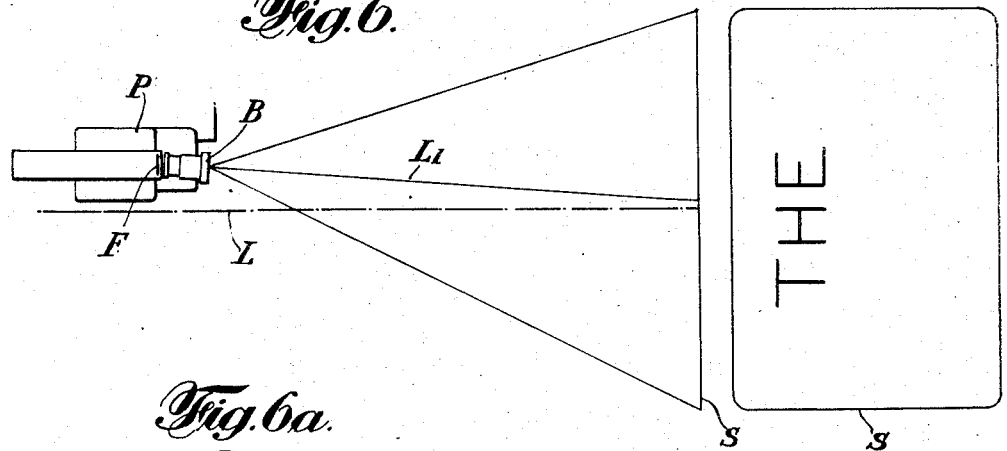

Oct. 1, 1935.  H. C. CONORD  2,016,034
PROJECTION SYSTEM
Filed Oct. 14, 1931   3 Sheets-Sheet 3
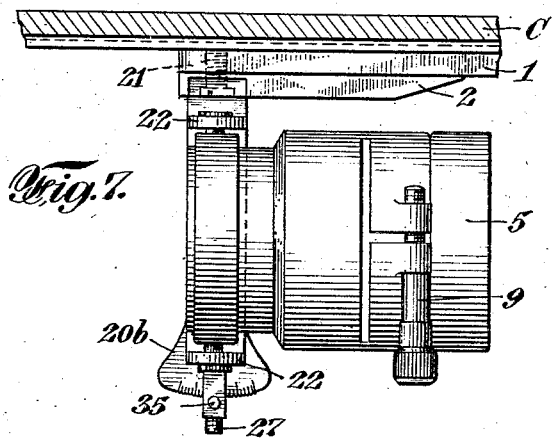
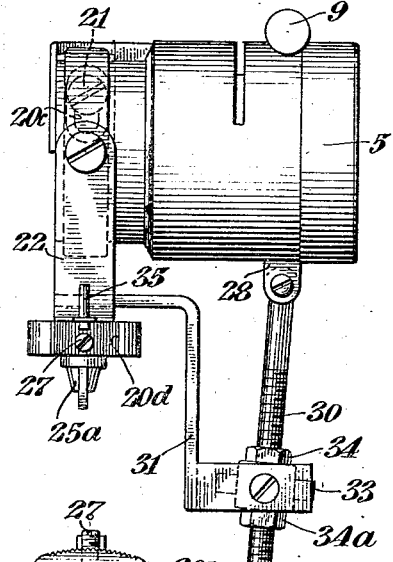
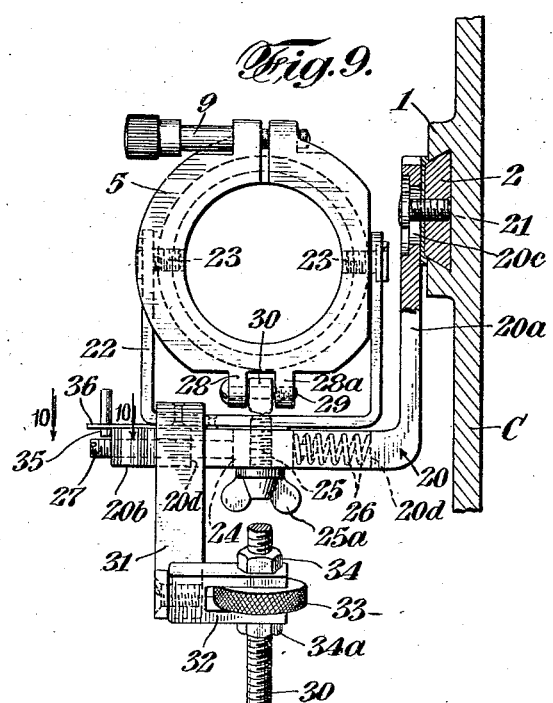
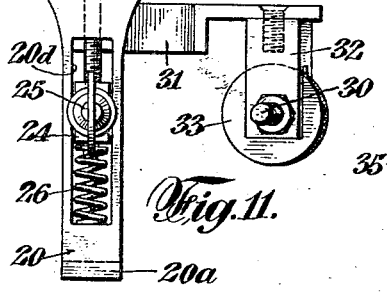
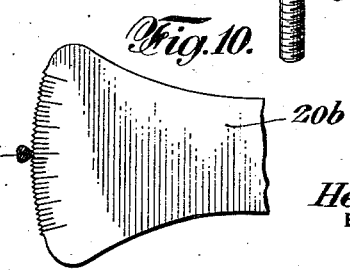
INVENTOR
*Herbert C. Conord*
BY
*Ward, Crosby & Neal*
ATTORNEYS Patented Oct. 1, 1935

2,016,034

UNITED STATES PATENT OFFICE 2,016,034

PROJECTION SYSTEM

Herbert C. Conord, Brooklyn, N. Y., assignor to Trans-Lux Daylight Picture Screen Corporation, New York, N. Y., a corporation of Delaware Application October 14, 1931, Serial No. 568,665

4 Claims. (Cl. 88—24)

My invention relates to projector mechanisms and has particular reference to an arrangement for substantially eliminating or largely preventing keystone distortion on a motion picture screen, or equivalent.

My invention, in a prominent phase thereof, relates to adjusting mechanism for the projection lens of a projector mechanism and, more particularly, my invention involves an arrangement for angularly relating the axis of a projection lens to a line extending perpendicularly with respect to the center of any given film section while the latter is in the projection field of said projector mechanism.

Further objects, advantages and characteristics of my invention will become apparent from the following detailed description taken in connection with the accompanying drawings.

My invention resides in the projector mechanism, adjustable projection lens support or mount, and other features of the character hereinafter described and claimed.

For an understanding of my invention and for an illustration of some of the many forms thereof, reference is to be had to the accompanying drawings, in which:

Figure 1 is a plan view, partly in section and partly broken away, showing a projection lens positioned in accordance with my invention;

Fig. 2 is a side elevational view of a support for a projection lens;

Fig. 3 is an end elevational view, partly in section, of the support shown in Fig. 2;

Fig. 4 is a bottom view of the support shown in Fig. 2;

Fig. 5 is a diagrammatic view of a projection arrangement;

Fig. 5a is an elevational view showing the end of a projection lens;

Fig. 5b is a diagrammatic view illustrating keystone distortion on a screen;

Fig. 6 is a diagrammatic view of a projection arrangement in accordance with my invention;

Fig. 6a is an elevational view showing the end of a projection lens;

Fig. 6b is a diagrammatic view illustrating a screen image area after removal of screen distortion;

Fig. 7 is a plan view, partly in section, of another form of my invention;

Fig. 8 is a side elevational view of the form of my invention shown in Fig. 7;

Fig. 9 is an end elevational view of the form of my invention shown in Figs. 7 and 8; and Fig. 10 is a horizontal sectional view, partly in plan and is taken on the line 10—10 of Fig. 9 looking in the direction of the arrows;

Fig. 11 is a view in plan of a part of Figs. 7, 8, and 9 looking upwardly.

In general, my invention relates to an arrangement for substantially or largely eliminating keystone distortion on a motion picture screen. To this end, I mount the projection lens of a suitable projector mechanism in an adjustable or pivotal manner so that the axis of said projection lens may be angularly related to a line extending perpendicularly with respect to the center of any given film section while the latter is in the projection field of the projector mechanism.

For one form of mechanism which has proved satisfactory in operation for the purpose stated, reference is to be had to Figs. 1, 2, 3, and 4 wherein C illustrates the center frame of any suitable projector such, for example, as is known in the art as a Simplex projector. Carried by the frame C in dove-tail relation are members 1 and 2, the member 2 being horizontally slidable with respect to the member 1 under the control of any suitable mechanism, not shown.

In accordance with my invention, a bracket 3 is suitably secured to the member 2. As shown in Figs. 2, 3, and 4, the bracket 3 comprises vertical and horizontal sections 3a and 3b, the vertical section 3a, preferably, comprising a plurality of elongated slots 3c through each of which extends a clamping screw 4, the screws 4 being threaded into the member 2, and the heads of said screws 4 coacting with the walls of the respective slots 3c. By virtue of this arrangement the bracket 3 may be vertically adjusted as desired and thereafter positively held in a desired position under the influence of said screws 4.

Carried by the horizontal section 3b of the bracket 3 is the holder 5 which receives the barrel B of any suitable projection lens. As illustrated, the holder 5 comprises a flat surface 5a which rests upon the upper flat surface of the aforesaid horizontal bracket section 3b.

In accordance with one form of my invention, said horizontal bracket section 3b comprises a pair of spaced parallel slots 3d, 3d, Fig. 4, each slot slidably receiving a block 6. Swivelled to each block 6 is a screw 7, each screw 7 extending through a passage in the outer part of the horizontal bracket section 3b and being threaded thereto. Threaded through each block 6 is a screw 8 which, at its end, is threaded into the aforesaid flat surface 5a of the holder 5. The screws 8 are adapted to exercise a clamping effect upon the lower surface of the horizontal bracket section 3b and, therefore, each of said screws 8 comprises a clamping section 8a beyond which extends the portion of the screw adapted for manual manipulation.

As is usual, the holder 5 may be a split ring, opposite sections of which are flanged for the reception of a clamping screw 9. Furthermore, the holder 5 may have a light-opaque cylinder 10 associated therewith, said cylinder 10 being telescopically related to the holder 5 in freely slidable relation. In accordance with usual practice, the outer end of the cylinder 10 may comprise a laterally extending flanged section 10a to which, at approximately diametrically opposite sides thereof, ends of the respective rods 11 are fixedly secured, each rod 11 being disposed outwardly of the cylinder 10. As clearly appears in Fig. 3, the holder 5 comprises lugs 5b, 5b disposed at approximately diametrically opposite sides thereof, these lugs being provided with passages for the free slidable reception of the respective rods 11. Disposed about each rod 11 is a helical spring 12, one end of each of which engages the flanged section 10a of the cylinder 10 and the other ends of which engage the respective lugs 5b. Accordingly, it results that the cylinder 10 is biased from right to left, Fig. 2, such movement being discontinued when heads 11a on the respective rods 11 engage shoulders in the passages of the respective lugs 5b, Fig. 2.

As hereinbefore stated, the projector shown in Fig. 1 may be of the type known to the art as a Simplex projector although, as well, any other suitable projector may be employed. The projection field arrangement including the film trap assembly, the film driving mechanism, and other mechanical details of such projectors are well understood by those skilled in the art and, therefore, a detailed description of such characteristics of these prior art projectors need not be included in this specification.

Accordingly, in Fig. 1, I have merely shown the projector arrangement in a general manner as comprising the film trap assembly 13 which is detachably secured to the projector center frame C. This film trap assembly comprises the usual film guiding wheels 14 and 14a, and the movable gate 15. The film F, which preferably is ordinary motion picture film, is shown in the film trap assembly between the members 13 and 15 and, in the relation shown in Fig. 1, said film F travels in a direction approximately at right angles to the plane of the sheet of drawing paper.

As is well understood, the film trap assembly comprises a transverse passage, namely, the projection field or picture aperture through which the projection light beam passes from left to right, Fig. 1, sections of said film F passing successively through the aforesaid projection field. Beyond the film trap assembly, the projecting light beam passes through the cylinder 10, through the projection lens in the holder 5, and then to a suitable screen S where images are exhibited of the representations on the film F.

The use of front projection for the theatrical display of motion pictures is well understood and is commonly practiced. Front projection involves the disposition of the projector and auditorium area at the same side of the display screen, the projecting light beam being reflected to the audience by said screen. Rear projection, with its attendant advantages, is also well understood. In rear projection, the audience area and the projector are on opposite sides of the screen, the projecting light beam passing through the screen in order to reach the audience.

In front projection, due to the size of the auditorium area, the projector may be disposed a relatively great distance from the screen and, therefore, a projection lens of relatively long focus may be utilized. Since the space behind the screen is relatively small, the projector, for rear projection, is positioned relatively close to the screen, this necessitating the use of a suitable short focus projection lens such, for example, as the positive-negative lens combination described in U. S. Letters Patent No. 1,863,099, the barrel B being herein shown as having such a positive-negative lens combination disposed therein.

For front projection, therefore, the "throw" between projector and screen is relatively long while, for rear projection, the throw is relatively short. As is well understood, for the presentation of multi-reel motion pictures, it is common practice to utilize at least a pair of projectors disposed, respectively, at opposite sides of the screen center line. Due to the long throw existing in ordinary front projection, the disposition of the projectors on the respective opposite sides of the screen center line introduces no serious operating difficulties as regards the obtaining of screen images having proper definition. However, the disposition of the projectors at the respective opposite sides of the screen center line and the positioning of said projectors relatively close to the screen as practiced in rear projection introduces serious difficulties as regards image reproduction. To overcome such defects, it is necessary that certain corrective measures be taken and, it is for this purpose, that the hereinbefore described mechanism is utilized.

In Fig. 5, I have illustrated the projector P as disposed to one side of the screen center line L and preferably at about the same horizontal level, the projector being approximately the distance from said center line L which is necessary if there is to be sufficient space between the pair of projectors for the operators thereof to properly attend to their duties. The axis L1 of the projecting light beam from the light source and the axis through the projection lens or the barrel B thereof substantially coincide, the line L1 intersecting the screen S substantially at the center thereof. Under such circumstances, where the projector P is laterally spaced from the screen center line as above stated, it results that the screen images and the peripheral boundary of the screen image area are distorted and of keystone configuration somewhat as illustrated to an exaggerated degree in Fig. 5b.

I have discovered that this keystone effect may be substantially overcome by first bodily shifting the projector and the projection lens as a unit, and by thereafter bodily shifting the projection lens with respect to the projector so that the axis thereof is angularly related with respect to a line extending perpendicularly from the center of any given film section while the latter is in the projection field of said projector mechanism. Thus, the projector P is shown in Fig. 6 after it has been moved in a counterclockwise direction from the position thereof indicated in Fig. 5. I have found in practice that the new position to which the projector is thus moved is preferably that position wherein the front plate of the projector frame is substantially parallel with respect to the projection screen. By thus moving the projector, the axis of the projecting light beam is shifted from the screen center and the image area is moved partly off the screen. Then, by shifting the projection lens clockwise, Fig. 6, with respect to the projector while leaving other parts of the projector stationary, the image area may be restored to the screen and, by so doing, the axis L1 of the projection lens becomes angularly related with respect to a line extending perpendicularly from the center of any given film section in the projection field of the projector mechanism. Usually, several adjustments are required of the projector as a unit and the projection lens independently of the projector in order to obtain the desired optical effect, i. e., the proper disposition of the image area on the screen substantially free from keystone distortion.

It is for the purpose of securing the above described adjustment of the projection lens independently of the other projector parts that I utilize the mechanism hereinbefore described. As stated, the projection lens barrel B is carried by the holder 5 and, as the parts are positioned in Figs. 1 and 6, the axis L1 of the projection lens has been angularly related to a line extending perpendicularly with respect to the center of any given film section while the latter is in the projection field of the projection mechanism. As stated, the bracket 3 is carried by the projector center frame and it is to the horizontal arm 3b of this bracket that the projection lens is directly though adjustably secured. Accordingly, when the projector is bodily moved to shift the image area off the screen as hereinbefore described, it results that the projection lens moves therewith.

In order to secure adjustment of the projection lens with respect to the projector, the clamping screws 8 may be slightly retracted while still leaving them in engagement with the flange 5a of the holder 5. Then, with the clamping screw 8 to the right, Fig. 4, held stationary, the screw 7 to the left, Fig. 4, may be advanced or retracted to swing the holder 5 in one direction or the other as may be required. As stated, the holder 5 carries the barrel B of the projection lens and, therefore, the projection lens partakes of the movement imparted to said holder 5.

Alternatively, the clamping screw 8 to the left, Fig. 4, may be held stationary, the screw 7 to the right, Fig. 4, being either advanced or retracted to swing the holder 5 in one direction or the other as may be desired.

In the manner described above, the projection lens may be shifted in the desired manner. In the example shown, it is important to note that the two screws 7 may be simultaneously adjusted to impart lateral movement only to the holder 5 and likewise to the projection lens carried thereby. Therefore, with the form of my invention shown in Figs. 1-4 inclusive, the mechanism comprising the screws 7 and 8 may be used for adjusting the barrel 5 angularly in the manner stated and also laterally. This is advantageous but my invention is not to be limited in this respect.

As stated, the cylinder 10 is carried by the barrel 5 and, therefore, these two members move together during angular or lateral adjustment of said barrel 5. In operation, the cylinder 10 rests against the gate 15 of the film trap assembly as clearly appears from Fig. 1.

In Fig. 5b, I have illustrated the keystone effect which, in accordance with my invention, is substantially overcome as clearly appears from a consideration of Fig. 6b.

In Figs. 5a and 6a, I have illustrated the end of the projection lens during projection, the rectangular areas defining the borders of the respective projecting light beams. A comparison of these views is indicative of the shift of the light beam which occurs due to the hereinbefore described angular adjustment of the projection lens.

For a modified form of my invention, reference is to be had to Figs. 7, 8, 9, and 10 wherein a bracket 20 is shown as comprising a vertical section 20a and a horizontal section 20b, the vertical section 20a preferably comprising an elongated slot 20c, Fig. 8, through which extends a screw 21 threaded into the hereinbefore described member 2, the head of said screw coacting with the exterior surface of the aforesaid vertical section adjacent the slot 20c.

Carried by the horizontal section 20b of the bracket 20 is a U-shaped bracket 22 having upwardly extending arms to which the hereinbefore described holder 5 is suitably secured. Preferably but not necessarily, the holder 5 is secured to the bracket 22 by screws 23, 23 which extend loosely through the respective opposite arms of the bracket 22 and are threaded into the barrel 5 at diametrically opposite sides thereof. By virtue of this arrangement, the holder 5 is swivelled for pivotal movement in a vertical direction, Fig. 9, with respect to the bracket 22.

The holder 5 and bracket 22 are adapted for pivotal horizontal movement together on the horizontal arm 20b of the bracket 20 and said holder 5 and bracket 22 are also adapted for horizontal movement together from left to right or vice versa, Fig. 9. For this purpose, an arrangement of any suitable character may be utilized. As shown, the horizontal bracket arm 20b is provided with an elongated slot 20d slidably receiving a block 24 through which extends the shank of a screw 25 threaded into the horizontal section of the bracket 22, the screw 25 having an operating head 25a. As illustrated, the block 24 may be biased from right to left, Fig. 9, by a helical spring 26 whereby said block 24 is held in engagement with an adjusting screw 27 threaded through the end of the bracket arm 20b. As will be hereinafter pointed out, the mechanism just described is utilizable for so adjusting the holder 5 and the thereby-carried projection lens that the axis thereof is angularly related in suitable manner to a line extending perpendicularly with respect to the center of any given film section while the latter is in the projection field of the projection mechanism.

Depending from the holder 5 are a pair of spaced ears 28, 28a through which extends a member 29 upon which a depending threaded shank 30 is pivoted. Depending from the bracket 23 and suitably secured thereto is a bracket arm 31 carrying a clevis-like member 32 so perforated that the shank 30 extends freely therethrough. Disposed between the arms of the member 32 is a thumb nut 33 through which said shank 30 extends in threaded relation. Furthermore, the shank 30 also preferably carries a pair of lock nuts 34, 34a coactable with the respective arms of the member 32.

If desired, the extreme end of the horizontal bracket section 20b may be widened and serrated or notched as indicated in Fig. 10. Coactable with these serrations or notches is a pointer or indicator 35 which depends from and is carried by a member 36 carried by and movable with the bracket 22.

In operation, the holder 5 of Figs. 7, 8, and 9, carries a projection lens and barrel the same as the corresponding parts of Figs. 1, 2, 3, and 4. When the axis through this projection lens is to be shifted, the screw 25 is slightly retracted whereby the barrel 5 and the bracket 22 may be manually swung to a desired extent in either a clockwise or counter-clockwise direction, Fig. 7. Thereupon, the screw 25 may be tightened to positively retain the barrel 5 and bracket 22 in the position to which adjusted. By virtue of this adjustment together with the bodily adjustment of the projector as hereinbefore described, the image area may be properly centered on the screen while at the same time substantially or largely eliminating keystone distortion therefrom.

The adjusting mechanism described above is utilized when the projector is disposed approximately at the same horizontal level as the screen center line. In case the projector is disposed a substantial distance either above or below said screen center line, it may be desirable to correct for the resultant keystone distortion and, if so, the thumb screw 33 together with the locking nuts 34, 34a may be suitably manipulated to swing the holder 5 and the thereby-carried projection lens either counter-clockwise or clockwise, Fig. 8.

The adjusting mechanism last described may be used either with or without that previously described for obtaining horizontal pivotal movement of the holder 5. When the two adjusting mechanisms are provided as shown in Figs. 7, 8, 9, and 10, the keystone distortion may be eliminated no matter whether the projector is approximately horizontally to one side of or vertically above or below the screen center line.

In addition to the foregoing and after slight retraction of the screw 25, the screw 27 may be operated to shift the block 24 either to the right or the left, Fig. 9, whereby the holder 5 and the thereby-carried projection lens may be shifted laterally in a horizontal direction.

The last described movement of the projection lens together with that lateral lens movement described in connection with the simultaneous adjustment of the screws 7, 7 of Figs. 1-4 is utilizable in connection with the two kinds of motion picture film now in commercial use, i. e., the type having a sound track at one side of the picture frames and the type omitting said sound track. As well understood in the art, it is necessary to provide for such lateral adjustment of the projection lens so that the projector may use either of the two types of film above noted.

The hereinbefore described pointer 35 partakes of such pivotal adjustment as is imparted to the holder 5. Accordingly, on the bracket section 20b, there is obtained an indication concerning the degree of pivotal adjustment of the holder 5 and the thereby-carried projection lens. It shall be understood that the indicating mechanism just described may be omitted if desired since my invention is not to be limited thereto.

It will be understood that various mechanical changes may be made without departing from the spirit of my invention. Thus, one of the screws 7 together with the block 6 associated therewith as shown in Figs. 1-4 may be omitted, a single screw 7 and block 6 being sufficient to obtain the desired adjustments. In the arrangement of Figs. 7-9 inclusive, the screw 27 may be swivelled to the block 24, in which case the spring 26 may be omitted. Similarly, other mechanical changes may be made as desired.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projector having a center frame, a bracket carried thereby and having a horizontal arm, a projection lens holder slidable on said bracket arm toward and from said center frame, and means for pivotally supporting said holder on said bracket arm for movement substantially in a horizontal plane whereby the projection lens axis may be angularly related to a line extending perpendicularly with respect to the center of any given film section while the latter is in the projection field of said projector.

2. In a projector having a center frame, a a bracket carried thereby and having a horizontal arm with a slot, a block movable in said slot, and a projection lens barrel pivotally mounted on said block.

3. In a projector having a center frame, a bracket carried thereby and having a horizontal arm with a slot, a block movable in said slot, means for adjusting said block toward the respective opposite ends of said slot, a projection lens barrel pivotally mounted on said block, and means for positively retaining said barrel in a pivotally adjusted position.

4. In a projector having a center frame, a bracket carried thereby and having a horizontal arm, a projection lens holder slidable on said bracket arm, means for moving said projection lens holder toward and from said center frame while maintaining the axis thereof in a horizontal plane, and means for pivotally supporting said projection lens holder on said bracket arm for movement substantially in a horizontal plane whereby the projection lens axis may be angularly related to a line extending perpendicularly with respect to the center of any given film section while the latter is in the projection field of said projector.

HERBERT C. CONORD.